United States Patent
Imran

(10) Patent No.: US 9,219,955 B2
(45) Date of Patent: *Dec. 22, 2015

(54) APPARATUS, SYSTEM AND METHOD FOR UNDERWATER VOICE COMMUNICATION BY A DIVER

(75) Inventor: Mir Imran, Los Altos Hills, CA (US)

(73) Assignee: InCube Labs, LLC, San Jose, CA (US)

( * ) Notice: Subject to any disclaimer, the term of this patent is extended or adjusted under 35 U.S.C. 154(b) by 931 days.

This patent is subject to a terminal disclaimer.

(21) Appl. No.: 13/352,249

(22) Filed: Jan. 17, 2012

(65) Prior Publication Data

US 2012/0180788 A1    Jul. 19, 2012

Related U.S. Application Data

(60) Provisional application No. 61/433,168, filed on Jan. 14, 2011.

(51) Int. Cl.
| | | |
|---|---|---|
| H04R 1/00 | (2006.01) | |
| H04R 1/44 | (2006.01) | |
| B63C 11/26 | (2006.01) | |
| H04B 11/00 | (2006.01) | |

(52) U.S. Cl.
CPC . *H04R 1/44* (2013.01); *B63C 11/26* (2013.01); *H04B 11/00* (2013.01); *H04R 2217/03* (2013.01); *H04R 2460/13* (2013.01)

(58) Field of Classification Search
CPC ...... H04R 1/44; H04R 2217/03; B63C 11/26; H04B 11/00
USPC .......... 367/132; 128/200.29, 201.11; 381/151
See application file for complete search history.

(56) References Cited

U.S. PATENT DOCUMENTS

| | | | | |
|---|---|---|---|---|
| 3,965,298 | A * | 6/1976 | Carlson | 381/54 |
| 4,241,235 | A * | 12/1980 | McCanney | 381/61 |
| 4,305,244 | A * | 12/1981 | Seymour et al. | 460/2 |
| 4,563,758 | A * | 1/1986 | Paternostro | 367/132 |
| 4,852,682 | A * | 8/1989 | Benjamin | 181/121 |
| 5,455,842 | A * | 10/1995 | Mersky et al. | 379/175 |
| 5,555,533 | A * | 9/1996 | Peck | 367/132 |
| 5,706,251 | A * | 1/1998 | May | 367/132 |
| 5,868,130 | A * | 2/1999 | Stier | 128/201.28 |
| 6,360,182 | B1 * | 3/2002 | Hales | 702/139 |
| 6,762,678 | B2 * | 7/2004 | Arens | 340/506 |
| 8,358,973 | B2 * | 1/2013 | Rhodes et al. | 455/40 |
| 2003/0151979 | A1 * | 8/2003 | Pierot | 367/132 |
| 2005/0049732 | A1 * | 3/2005 | Kanevsky et al. | 700/94 |
| 2009/0213697 | A1 * | 8/2009 | Irie | 367/134 |

FOREIGN PATENT DOCUMENTS

| | | |
|---|---|---|
| JP | 09-315386 | 12/1997 |
| WO | WO 2012/021597 A2 | 7/2012 |

OTHER PUBLICATIONS

International Search Report and Written Opinion as issued in corresponding application PCT/US2012/021597, dated Sep. 24, 2012.

* cited by examiner

*Primary Examiner* — Luke Ratcliffe
*Assistant Examiner* — Hovhannes Baghdasaryan
(74) *Attorney, Agent, or Firm* — Mahamedi Paradice LLP

(57) ABSTRACT

Embodiments of the invention provide a system, apparatus and methods for underwater voice communication by a diver to other divers and surface ships. In many embodiments, the system includes a mouthpiece voice communication apparatus having a microphone for sensing the diver's voice and an acoustic transducer that conducts sound via conduction through the diver's teeth and skull to the cochlea so as to allow the diver to hear sounds. The mouthpiece is adapted to be easily attached to portions of a SCUBA or other underwater breathing apparatus. It may also be attached to or integral with a snorkel or similar apparatus.

60 Claims, 14 Drawing Sheets

APPARATUS, SYSTEM AND METHOD FOR UNDERWATER VOICE COMMUNICATION BY A DIVER

RELATED APPLICATIONS

This application claims the benefit of priority of Provisional U.S. Patent Application Ser. No. 61/433,168, entitled "Apparatus, System And Method For Underwater Voice Communication By A Diver", filed Jan. 14, 2011; which is fully incorporated by reference herein for all purposes.

This application is related to U.S. Provisional Patent Application No. 61/382,438, entitled "Self-Propelled Buoy For Monitoring Underwater Objects", filed Sep. 13, 2010; which is fully incorporated by reference for all purposes. This application is also related to U.S. Provisional Patent Application No. 61/384,612, entitled "Device, System and Method for Monitoring and Communicating Biometric Data of a Diver", filed Sep. 20, 2010; which is fully incorporated by reference for all purposes.

FIELD OF THE INVENTION

Embodiments described herein relate to a system for underwater voice communication. More specifically, embodiments described herein relate to an apparatus, system and method for underwater communication by a diver, such as a SCUBA (Self Contained Underwater Breathing Apparatus) or skin diver.

BACKGROUND

Since the early days of SCUBA diving with Jacques Cousteau, communication between SCUBA divers has been an issue. This is due to the fact that: i) the use of the SCUBA breathing apparatus (including a mouthpiece worn by the diver) precludes direct voice communication; and ii) because of risks of the underwater environment, divers have a critical need to communicate a variety of safety related messages to their fellow divers, e.g., communicating the amount of air they have remaining (a maxim of diving is to never dive alone, but instead always go with at least one other diver known as a "dive buddy"). As a result, a series of hand signs have been developed but these only cover a very limited number of messages and cannot quickly get the other diver's attention in critical situations. Various underwater graphical display devices have also been developed, but these have the same limitation. These devices, which are worn on the diver's wrist or arm, require the diver to divert his or her attention from what they are doing to look at the display. Typically, divers dive with their head tilted forward to see where they are going and their arms at their sides to reduce water resistance. Consequently, the diver's natural diving position is not conducive to monitoring a visual alert on their wrist or elsewhere (e.g., arm or waist). This is even true for visual alerts on the diver's face mask since the diver's attention is more focused on what is in front of them and not their face mask.

Acoustic alarm systems have been developed but they are not voice and can only communicate a limited number of messages which require the diver to understand an alarm code. Also none of these devices provide for communication between divers and a surface craft such as the dive boat (the boat which supports the divers). Further, none of these devices provide for communication between divers who are not in very close proximity. What is needed is an approach allowing for voice communication between divers while they are underwater and for voice communication between divers and a surface craft or ship.

BRIEF DESCRIPTION OF THE INVENTION

Embodiments of the invention provide a system, apparatus and methods for underwater voice communication by a diver to other divers and surface ships. In many embodiments, the system includes a mouthpiece having a microphone for sensing the diver's voice and an acoustic transducer that conducts sound via conduction through the diver's teeth and skull to the cochlea so as to allow the diver to hear sounds. The mouth piece is adapted to be easily attached to portions of a SCUBA or other underwater breathing apparatus. It may also be attached or integral to a snorkel or similar apparatus.

Embodiments of the invention allow the diver to speak and have two way voice communication with other divers and surface ships without having to remove their mouthpiece and without having any other specialized equipment. Embodiments of the invention also allow the diver to hear acoustic alarms and voice messages from a portable dive computer or other underwater device. Still other embodiments of the invention allow the diver hear music, radio or other audio input while they are underwater. Still other embodiments can provide the diver with an acoustic input of sounds from the body of water in which he or she is diving allowing the diver to hear the sounds of underwater marine life as well as the sounds of a surface craft or ship.

In one embodiment, the invention provides a mouthpiece apparatus for under water voice communication by a diver comprising a mouthpiece having an exterior coupling element for coupling to an air hose or other conduit of a SCUBA (or other underwater breathing apparatus) and an interior portion coupled to the coupling element and worn in the diver's mouth. The coupling element by be coupled directly to the air hose or to a fitting on the air hose. The coupling element and interior portion include a lumen for the passage of respired air by the diver. The interior portion has a curved shaped corresponding to a shape of the diver's mouth and has attached right and left bite structures. The bite structures include upper and lower surfaces for engaging a bite surface of the user's upper and lower teeth. One or both of the bite structures may include a retaining flange which can be perpendicular to a bite surface of the bite structure for retaining the mouthpiece in the diver's mouth.

An acoustic transducer is positioned on the top surface of at least one of the left or right bite structures. The acoustic transducer is configured to transduce an electrical signal input (e.g., from another communication device) into an acoustic output and acoustically couple to the diver's upper teeth to conduct the acoustic output from the diver's upper teeth through the skull to generate audible sound in at least one of the diver's ears when the diver is wearing the mouthpiece. Typically, the acoustic transducer is positioned to engage the upper (e.g., maxillary) back teeth of the diver's mouth, but may be positioned to engage any tooth or group of teeth in the diver's mouth. Also transducer properties can be tuned or otherwise adjusted. A microphone is positioned in or on the mouthpiece for detecting the diver's voice and generating an electrical output signal when the diver is wearing the mouthpiece. The microphone may be recessed or otherwise positioned to reduce breath sounds. This microphone output can be sent to an underwater communication device for underwater transmission to another diver(s) or a surface ship. In many embodiments, the communication device may correspond to an ultrasonic or other acoustical transmission device which transduces the electrical output signal into an acoustic signal which is transmitted by the acoustical transmission device. Also, in various embodiments, one or both of the communication device or microphone may include a filter (e.g., high pass, low pass, etc.) for filtering out breath and related sounds of the diver from his or her spoken words.

In an exemplary embodiment of using the invention, the diver attaches an embodiment of the mouthpiece to a fitting on a regulator or other component of his or her SCUBA gear. For embodiments having electrical couplings on the mouthpiece, the diver may then connect them to the underwater communication device. He or she may perform a few quick tests to assure that the communication system is working. Such tests can include putting in the mouthpiece and saying some test phrases (e.g., testing 1, 2, 3 etc.) while looking at a display that is integral to or coupled to the communication device to assure that a signal from the microphone is getting to the communication device. The test for the acoustic transducer can comprise putting the mouthpiece in the diver's mouth and pressing a test signal button on the communication device which then sends a test signal to the acoustical transducer which converts the electrical signal to an audio signal conducted through his teeth and skull which the diver then listens for. For either test, the diver can move the mouthpiece around in his or her mouth to find a position of the mouthpiece which yields the best audio input and/or electrical output signal from the microphone. The diver may perform a similar procedure for embodiments of the mouthpiece used in a snorkel. Having found that position, the diver may select a particular acoustic frequency or range of frequencies (e.g., akin to a channel) to use for input (hearing) and output (verbal speech). The diver may choose to use the system underwater for voice communication with other divers as well as surface ship. Depending upon the frequencies available, the diver may then select/assign a distinct acoustic frequency or frequency range for a particular diver as well as for a surface craft or ship. In many embodiments, the system will allow for separate frequency and/or frequency range to minimize cross talk from diver to diver as well as diver to surface ship communication. These and other aspects, embodiments and features are described in detail in the body of specification.

DETAILED DESCRIPTION OF THE INVENTION

Figure 1:
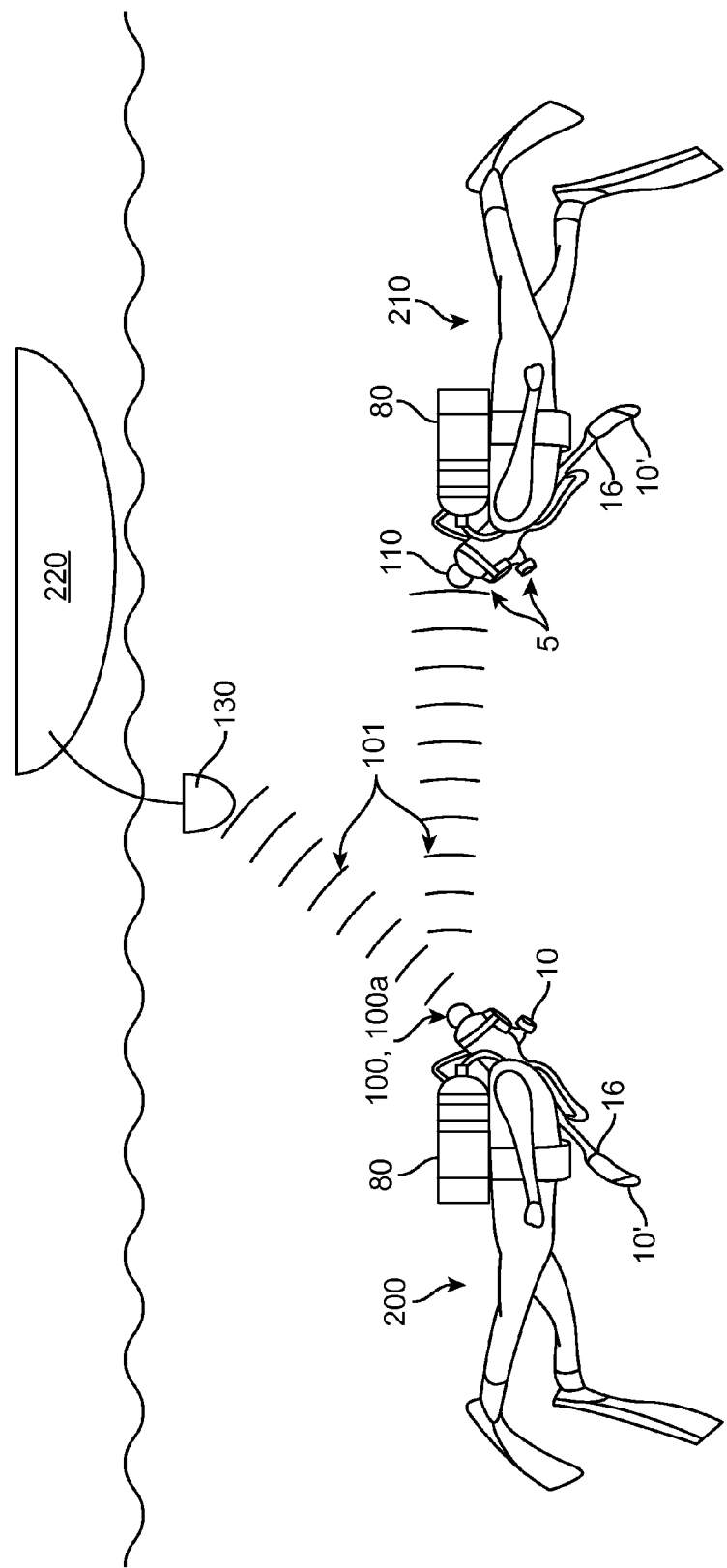
FIG. 1 is a schematic view of an embodiment of an underwater voice communication system for a diver.
Figure 1A:
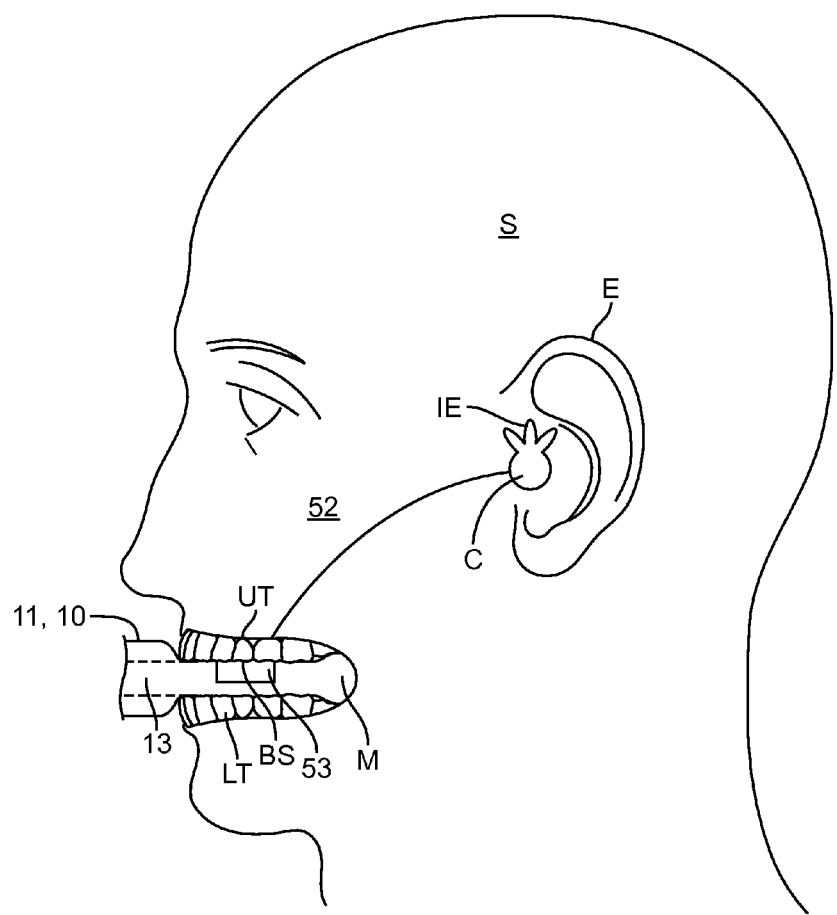
FIG. 1a shows an embodiment of a voice communication mouthpiece apparatus worn in the mouth and its use in the conduction of sound to the inner ear through the skull.
Figure 2:
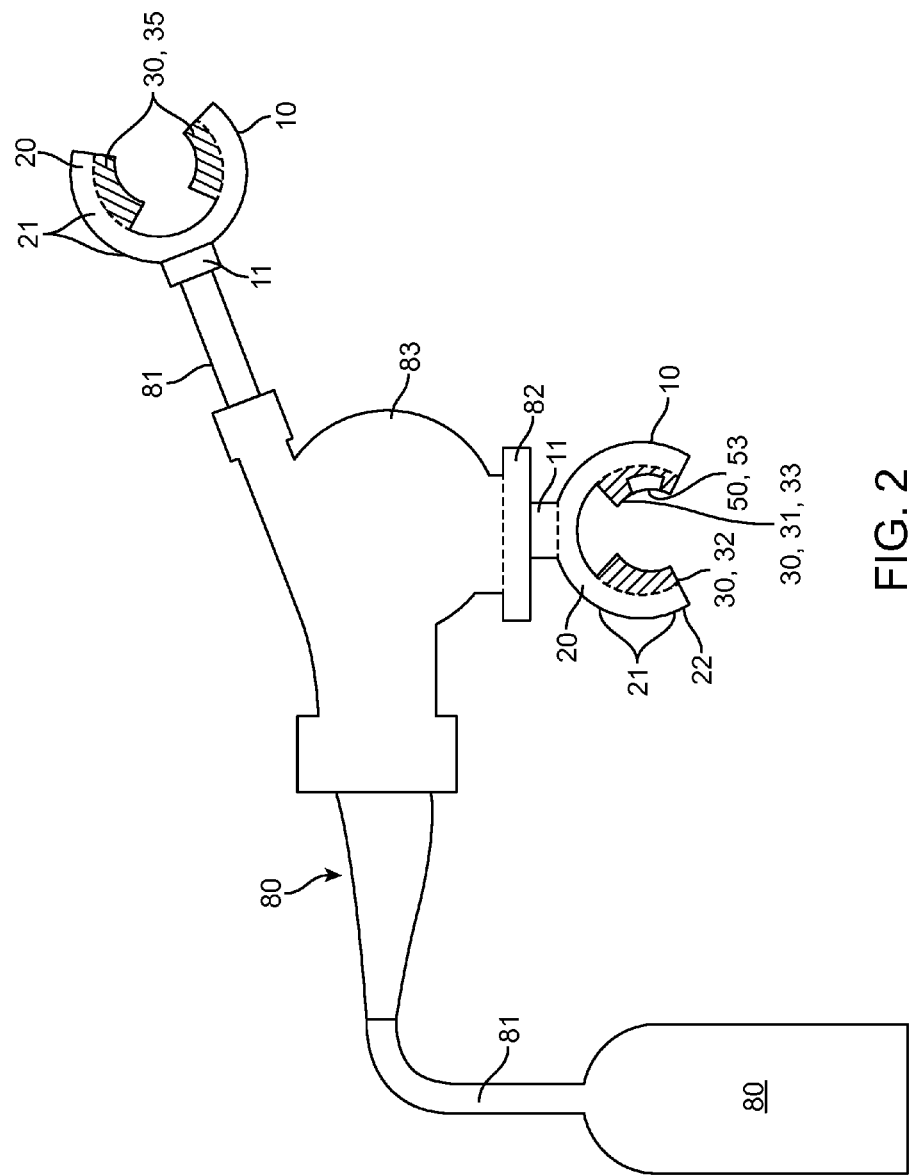
FIG. 2 is a lateral view illustrating embodiments of the mouthpiece coupled to an underwater breathing apparatus such as a SCUBA.
Figure 3:
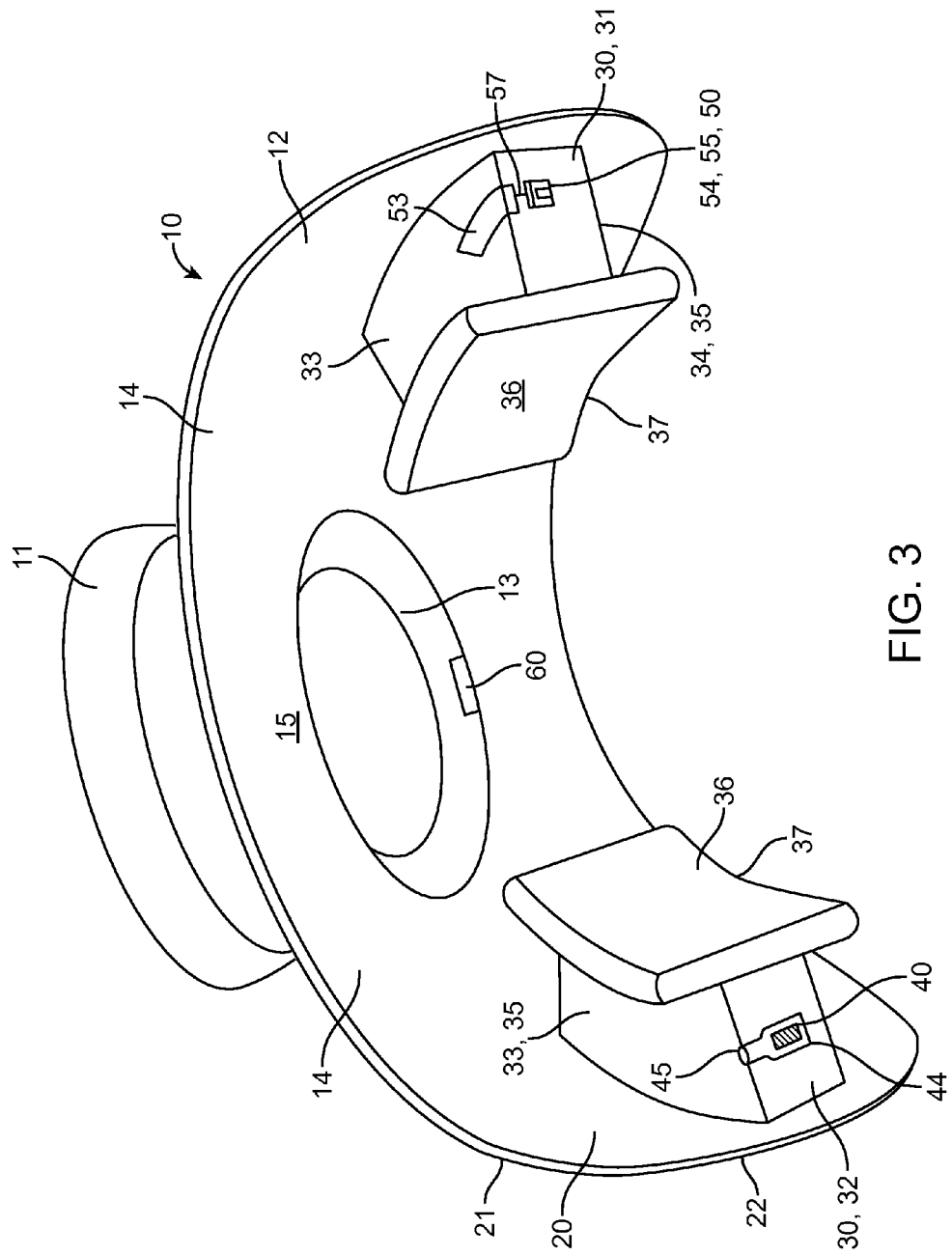
FIG. 3 is a perspective view showing various features of an embodiment of the mouthpiece.
Figure 4:
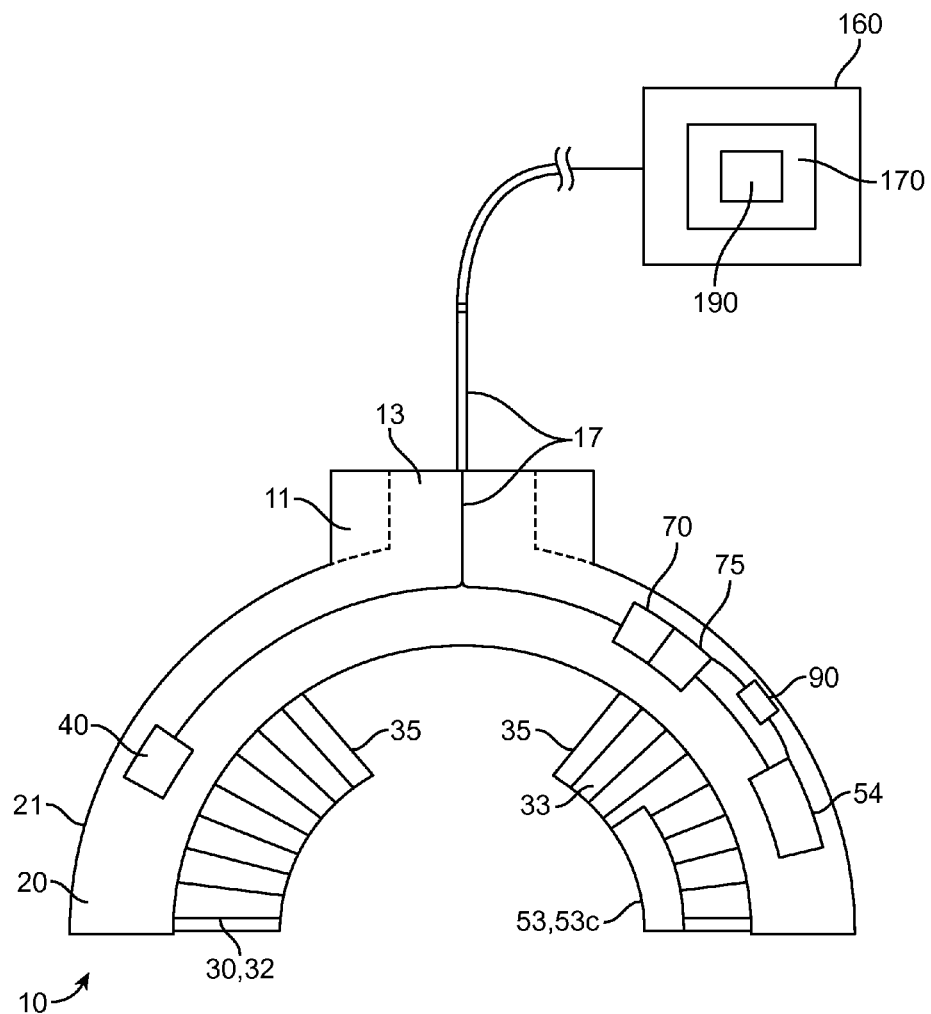
FIG. 4 is a lateral view showing an embodiment of the mouthpiece having an electrical connection means such as a wire for coupling to PWE devices such as a dive computer.
Figure 5A:
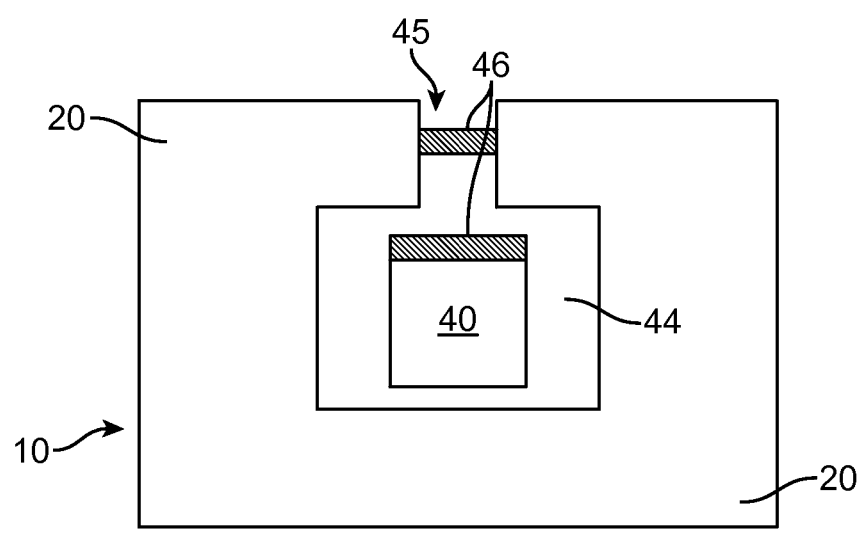
FIG. 5a is a side cut-away view showing an embodiment of the mouthpiece having a cavity and a microphone positioned in the cavity.
Figure 5B:
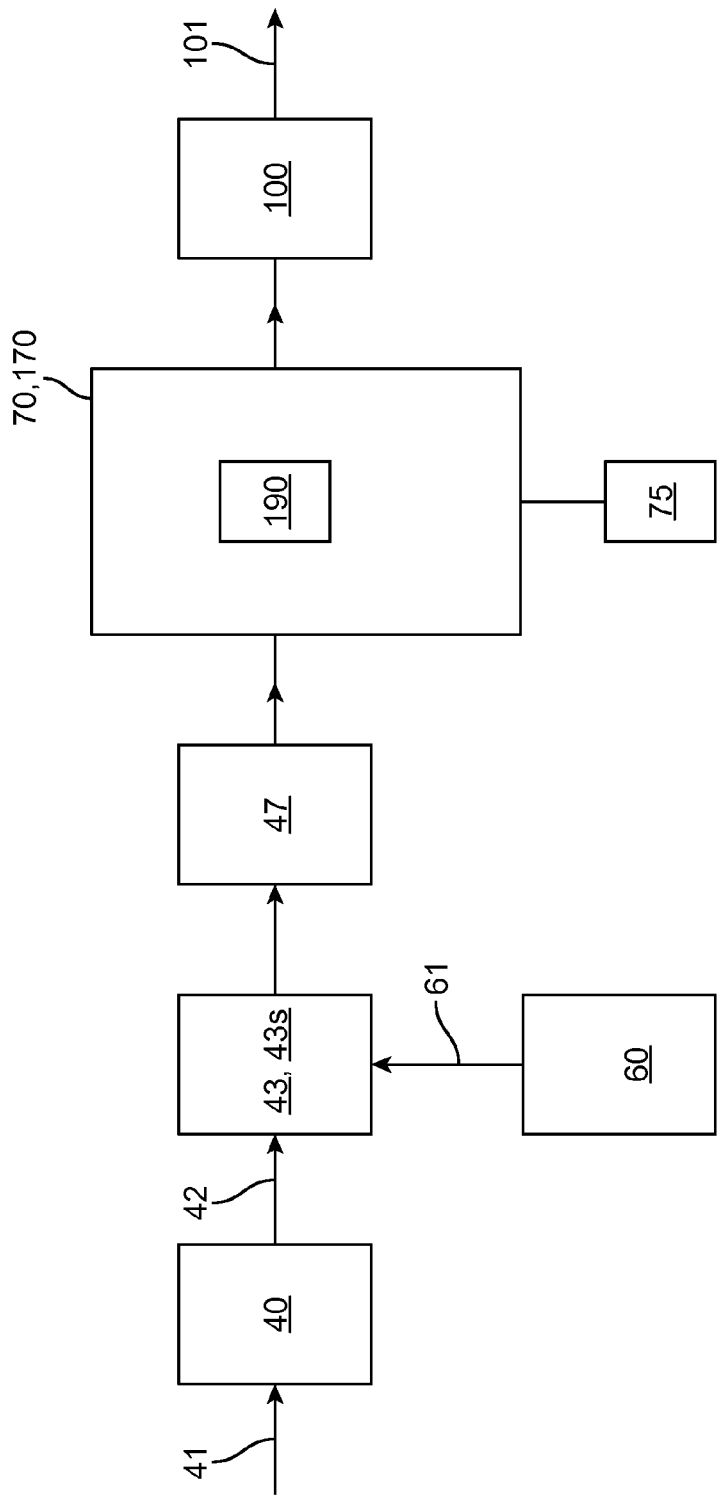
FIG. 5b is a block diagram illustrating the configuration and operation of an embodiment of the microphone.
Figure 6A:
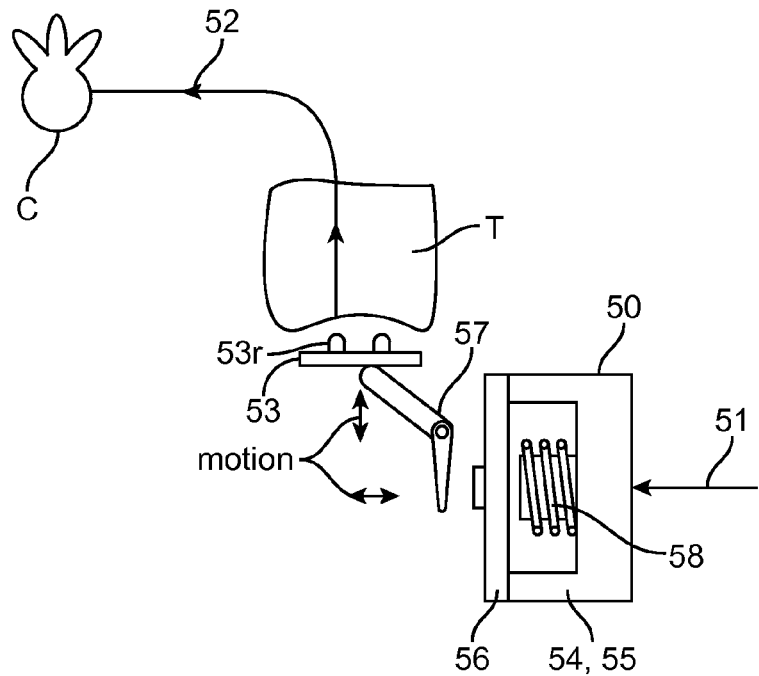
FIG. 6a is a side cut-away view showing an embodiment of the acoustic transducer comprising an electromagnetic driver, acoustical plate and connecting lever.
Figure 6B:
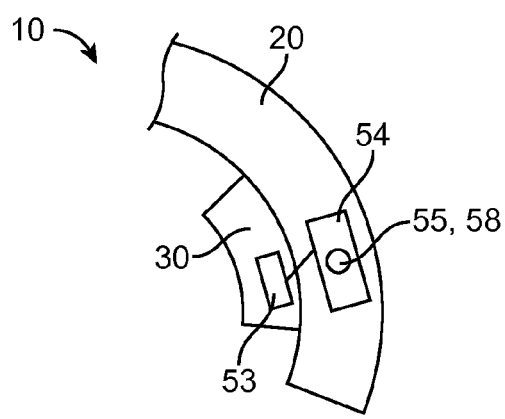
FIG. 6b is a top down view showing an embodiment of the acoustic transducer positioned in/on the mouth piece.
Figure 6C:
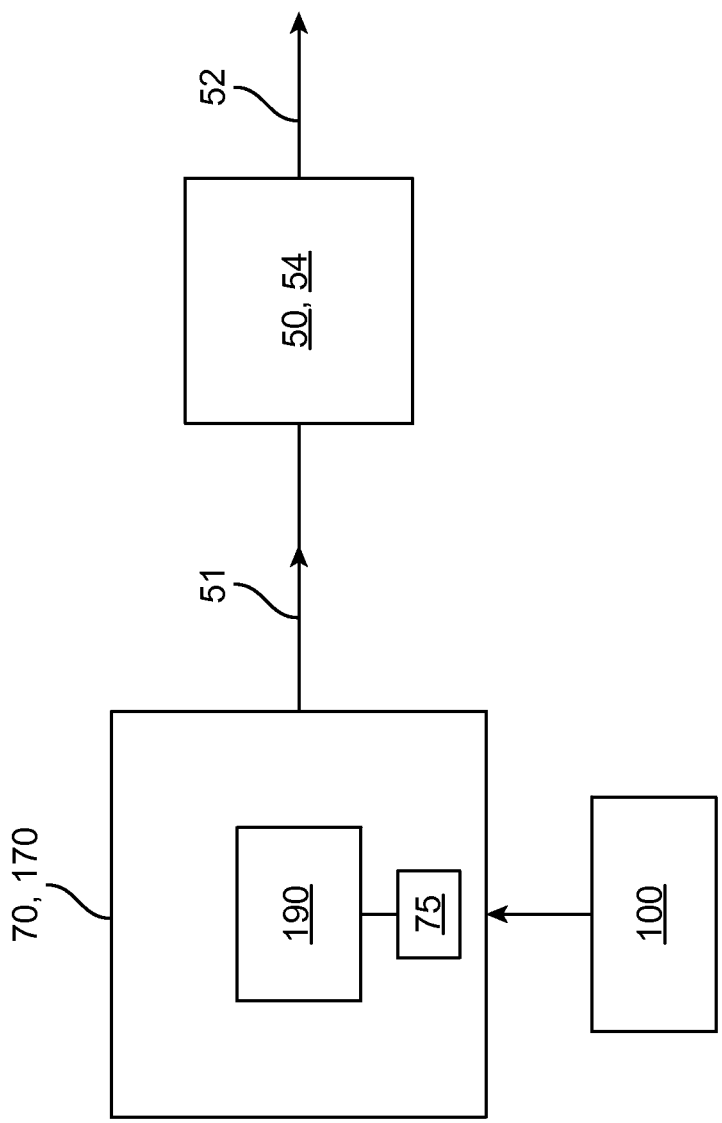
FIG. 6c is a block diagram showing the configuration and operation of an embodiment of the acoustical transducer.
Figure 7B:
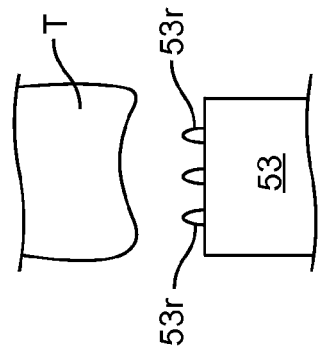
FIG. 7b is a side view illustrating an embodiment of the acoustical plate having conducting ridges.
Figure 7A:
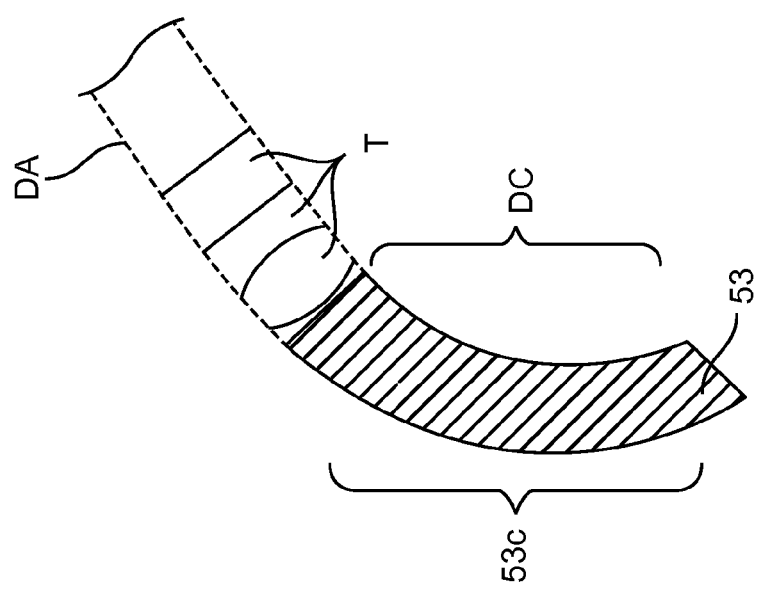
FIG. 7a is a top down view illustrating an embodiment of the acoustic plate having a curved shape corresponding to curvature of the diver's dental arches.
Figure 8:
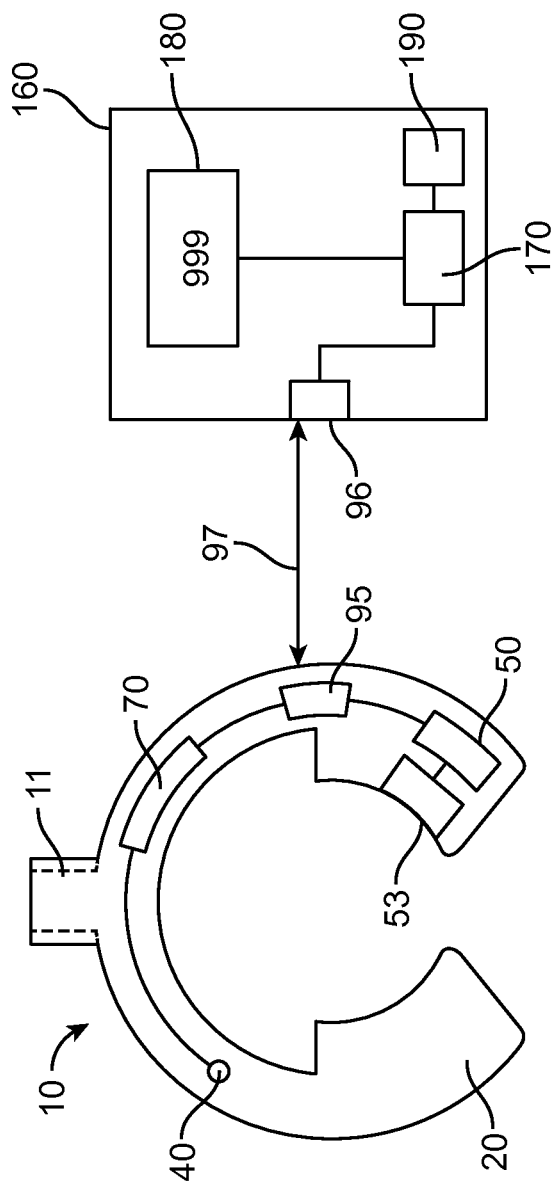
FIG. 8 illustrates an embodiment of the mouthpiece having a wireless communication device such an RF communication chip for communicating with a diver computer or other PWE device.
Figure 9A:
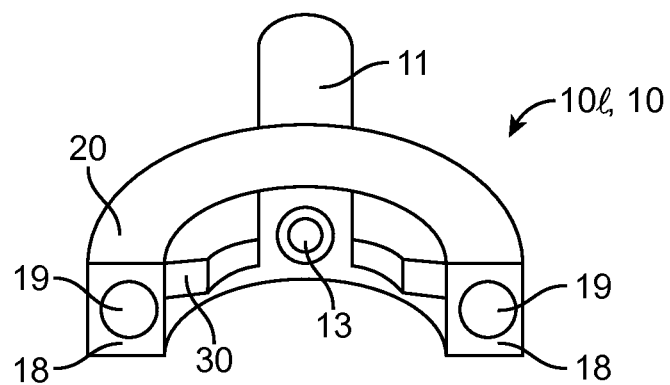
FIG. 9a is a cutaway perspective view illustrating an embodiment of a multilayer mouthpiece having a rigid core and softer outer layer.
Figure 9B:
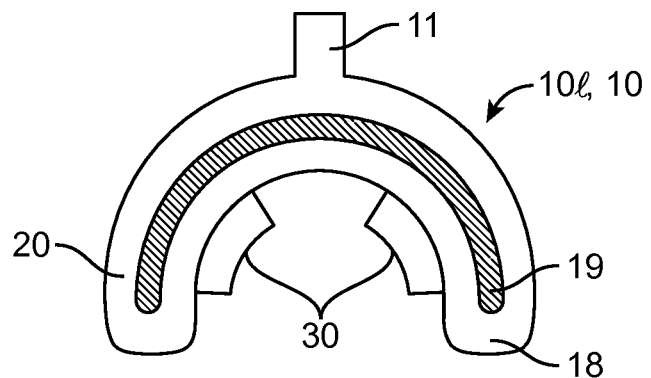
FIG. 9b is a cutaway top down view illustrating an embodiment of a multilayer mouthpiece having a rigid core and softer outer layer.

Referring now to FIGS. 1-11, an embodiment of a communication system 5 for voice communication from a first diver 200 to one or more other divers 210 or surface ships 220 comprises a voice communication mouthpiece apparatus 10 (herein mouthpiece 10) and an underwater communication device 100. Mouthpiece 10 is worn in the diver's mouth and is configured to attach to a regulator 82 or other fitting 83 of a SCUBA or other underwater diving apparatus 80. System 5, including mouthpiece 10, is configured to allow voice or other communication between a first underwater communication device 100 carried by diver 200 and a second underwater communication device 110 carried by other diver(s) 210 as well as between communication device 100 and a communication device 130 used by a ship 220. In one embodiment, communication device 130 can be incorporated into a buoy or array that is towed by ship 220. Communication device 100 (and/or 110), can be positioned on a variety of locations on the diver and/or on SCUBA 80. In one embodiment, it may be positioned on the diver's head and can be attached using a band or strap or it may be coupled to the hood of the diver's wetsuit. In many embodiments, communication device 100 may be incorporated into a portable watertight electronic device 160 carried or worn by the diver as is described herein.

In addition to communication with another diver 110 having a separate SCUBA 80, in various embodiments system 5 and mouthpiece 10 can also be adapted for communication with another mouthpiece 10' connected to a buddy breathing line 16 connected to same SCUBA 80 as used by diver 200 as is shown in the embodiment of FIG. 1. In such embodiments, mouthpieces 10 and 10' can be configured to both be operatively connected to the same communication device 100 or they may be configured to be directly connected to each other without the use of communication device 100. In use, such embodiments allow quick and ready communication between the diver 200 and the buddy breather without the need for any communication device or any set up procedure.

In many embodiments mouthpiece 10 includes a coupling element 11, an interior portion 20 coupled to the coupling element 11, a microphone 40 and an acoustic transducer 50.

Coupling element 11, couples the mouthpiece 10 to SCUBA 80. In various embodiments, coupling element 11 may be configured to couple directly to an air hose 81 of SCUBA 80 or a regulator 82 or other fitting 83 of SCUBA 80. The coupling element 11 and interior portion 20 include a lumen 13 for the passage of respired air by the diver.

One or both of microphone 40 and acoustic transducer 50 may be powered by a battery 90 or other electrical storage device 90 which is incorporated into the mouthpiece 10 or coupled to mouthpiece for example, by an electrical wire 17 or other electrical connection means 17. Battery 90 may comprise various lithium button or other miniature batteries known in the art. Battery 90 may also be shaped to have a form factor which readily fits into mouthpiece 10, for example in one embodiment, battery 90 may have curved shape which corresponds to the curvature of the diver's dental arches, DA. Battery 90 may also be used to power a processor 70 also contained in mouthpiece 10 and described in more detail herein.

Wire(s) 17 may also be configured to couple one or both of microphone 40 and transducer 50 (as well as electrical components of mouthpiece 10) to various electrical devices that are part of SCUBA 80 or are otherwise worn or carried by the diver such as communication device 100, and/or dive computer 160. Wire(s) 17 are insulated sufficiently to withstand depths of several hundred feet or more. A portion of the wires 17 may be embedded in the mouthpiece 10 and/or connected to the mouthpiece by an electrical connector configured for underwater conditions. Wire 17 can include at least a first and second wire for connection to microphone 40 and acoustic transducer 50. In some embodiments, a section of wire 17 may pass through lumen 13 of coupling element 11 so as to connect to one or more electrical devices that are part of SCUBA 80 or are otherwise worn or carried by the diver. In such embodiments, wire 17 is sufficiently thin or otherwise configured so as to not interfere or impede the passage of respired air through lumen 13.

In alternative or additional embodiments, one or both of microphone 40 and transducer 50 may be operatively coupled to communication device 100 and/or dive computer 160 via use of a wireless communication device 95 such as an RF communication chip 95 which may be embedded in the mouthpiece 10. RF communication chip 95 may correspond to an active or passive RF transceiver and may be embedded in mouthpiece 10. The frequency and power levels for use with such RF communication chip 95 can be adapted for underwater use to allow communication of signals 97 between an RF communication chip in the mouthpiece 10 and a corresponding chip 96 in communication device 100 and/or dive computer 160 carried by the diver. In use, such embodiments, allow the diver to readily couple mouthpiece 10 to communication device 100 and/or computer 160 without having to make any electrical connections. It also allows the diver to verify that the mouthpiece 10 is operating properly before getting into the water through the use of one or more diagnostic software modules 190 resident within dive computer 160 which can be configured to interrogate mouthpiece 10 for proper operation. In one embodiment, a verification procedure for assessing operation of mouthpiece 10 may consist of the diver computer prompting the diver to speak several test phrases with the mouthpiece in place (the prompts can be displayed as text or oral). Further in various embodiments, communication chip 95 and/or memory chip or other memory resources 75 coupled to chip 95 may contain various diver specific information (e.g., name, weight, health data, dive history etc.) which can be signaled to dive computer 160 allowing the dive computer to uniquely identify mouthpiece 10 as belonging to a particular diver and then upload that data into the dive computer. One or more of the mouthpiece identification and verification process may also be facilitated by use of a processor 70 such as microprocessor 70 which controls the handshake and other communications between communication chip 95 and chip 96. Processor 70 may also contain or be coupled to memory resources 75. In particular embodiments, such a configuration can be implemented through use of an ASIC (application specific integrated circuit) containing processor 70 (or other logic resources, e.g., a state device, etc.), memory resources 75 and even battery 90.

The interior portion 20 of mouthpiece 10 has a curved shape 21 corresponding to a shape of the diver's dental arches DA and has attached right 31 and left 32, bite structures 30. The curved shape 21 may be fabricated by taking a dental impression or image of the diver's mouth and then using that impression or image to fabricate a mold for making the mouthpiece and/or using stereolithography techniques known in the art. The bite structures 30 includes upper 33 and lower 34 surfaces 35 (also called bite surfaces 35) for engaging a bite surface BS of the diver's upper UT (also called maxillary) and lower teeth LT. Bite structures 30 are positioned and arranged to contact at least the back teeth of the diver, but may contact the front teeth as well. The bite structures 30 may also be configured to be acoustically isolated by from each other by fabricating all or a portion of the bite structures from various acoustically insulating materials known in the art.

In various embodiments, one or both of the bite structures 30 may include a retaining flange 36 for retaining the mouthpiece in the diver's mouth M by contacting an inside surface of the diver's teeth. Typically, flange 36 will be oriented perpendicular to bite surfaces 35, but other orientations are also contemplated (e.g., an acute angle). Also, flange 36 may have a curved shape or profile 37 which corresponds to the curvature of the diver's dental arches DA.

In various embodiments, mouthpiece 10 may be fabricated from elastomeric polymers such as silicone, polyurethane, copolymers thereof and other elastomers known in the art. Mouthpiece 10 may have a unitary construction and or may be fabricated from separate components which are joined. It may be fabricated using various methods known in the polymer processing arts, including molding and stereolithography methods. Also, molding may be done with the microphone 40, and/or acoustical transducer 50 in place or they may be added to cavities created in the mouthpiece for their positioning. The polymeric materials for the mouthpiece may be selected for several different mechanical and acoustical properties. For example, the material can be selected to achieve a desired durometer for the mouthpiece. The durometer of the material may be selected to maintain the shape of the mouthpiece but at the same time, reduce the bite force required for the diver to hold the mouthpiece in place. Suitable lower durometer embodiments, include the range of 20 to 50, more preferably, 30 to 40. In use, such lower durometer embodiments allow the diver to keep the mouthpiece in their mouth for extended periods (e.g., hours) without excessive discomfort or fatigue of their jaw muscles, particularly while speaking. The properties of the polymers used for the mouthpiece can also be selected to obtain a desired amount of acoustical insulation so as to minimize the transmission of sound from transducer 50 to microphone 40 so as to reduce or prevent feedback between the two.

In some embodiments, a mouthpiece having a lower durometer can be achieved by two ply or other multilayer configurations of the mouthpiece 10 where at least a portion of the mouthpiece comprises a lower durometer tooth contacting surface layer 18 (also referred to as a liner) which fits over a higher durometer (e.g., more rigid), underlying core structure 19. The later providing sufficient rigidity for holding the shape of the mouthpiece in the diver's mouth while the former provides a soft comfortable tooth contacting surface. Liner 18 may also be configured to provide acoustical insulation/dampening properties so as to reduce feedback between microphone 40 and transducer 50 by reducing the transmission of sound from transducer 50 and microphone 40. In use, such two ply or other multilayer embodiments 101 of mouthpiece 10 provide both for a more comfortable mouthpiece and one that minimizes or reduces feedback from the transducer 50 and microphone 40 while maintaining the shape of the mouthpiece. In related embodiments, mouthpiece 10 can have a three or even a four ply construction to provide additional amounts of acoustic insulation.

Microphone 40 is positioned in or on mouthpiece 10 and is configured to detect the sound 41 (herein voice sounds 41) from the diver's voice with the mouthpiece in place and generate an electrical output 42. Microphone 40 may comprise various miniature microphones known in the art and may comprise various electret microphones known in the art. The microphone 40 may include or be coupled to a preamplifier 47 as well as a filter device 43 for filtering out the diver's breath sounds or other non-speech related sounds (e.g., bubble and cavitation sounds). In various embodiments, filter 43 may correspond to one or more of a high pass, low pass or band pass filter. Filter 43 may also be programmable, so as to allow the user to select various acoustic criteria for filtering out breath sounds, such criteria including a particular frequency range, duration of sound and/or amplitude of sound that is filtered. Filter 43 may also be configured to filter out acoustic signals 52 (discussed below) generated by acoustical transducer 50 so as to minimize feedback from transducer 50 and microphone 40. In an alternative or additional embodiment, filter 43 may also be configured as, or include, a switching device 43s that shuts off the generation of signals 42 by microphone 40 when the diver is receiving acoustic signals 52 from transducer 50. In use, such embodiments provide another approach and means for minimizing or eliminating feedback between microphone 40 and acoustic transducer 50.

Microphone 40 may be placed in any number of locations in or on the mouthpiece 10, but is placed on an opposite side 22 of the mouthpiece as that containing acoustic transducer 50 so as to minimize feedback between the microphone and acoustic transducer 50 (side 22 being defined by the diver's left and right). In particular embodiments, the microphone is placed on the opposite bite structure 30 from that of acoustic transducer 50. In such embodiments bite structure 30 is configured to dampen or attenuate any vibrations coming from acoustical transducer 50. Also, microphone 40 may also be placed on the surface 12 of mouthpiece 10, but is more preferably recessed within the mouthpiece so as to attenuate breath sounds as well as reduce the likelihood of exposure to liquids in the diver's mouth.

In embodiments of the mouthpiece having a recessed microphone 40, the mouthpiece can include a cavity 44 in which the microphone is placed, wherein the cavity includes a small aperture 45 opening to the mouthpiece surface 12 to allow for acoustical conduction to the mouthpiece. The diameter of aperture 45 can be selected to minimize the entry of fluids into the cavity and in various embodiments can be in the range of 0.001 to 0.00001 (0.00254 to 2.54e-005 centimeter), more preferably, 0.0005 to 0.0008 inches (0.00127 to 0.002632 centimeter) with a specific embodiment of 0.0007 inches (0.001778 centimeter). One or both of aperture 45 and microphone 40 may include a waterproof layer 46, which may correspond to a porous material such as an expanded PTFE (polytetrafluoroethylene) material. Also in embodiments of the mouthpiece having a cavity 44, the microphone may also be potted in cavity 44 with a sound insulating material, such as one or more curable polymers having sound insulating properties (e.g., silicone). In use, such embodiments having a potted microphone 40, provide a means for reducing feedback between microphone 40 and acoustic transducer 50 as well as dampening of other unwanted sounds (e.g., from the diver clenching his jaw on the mouthpiece) which may be conducted through mouthpiece 10.

An acoustic transducer 50 is positioned on the upper surface 33 of at least one of the left or right bite structure 30. The acoustic transducer 50 is configured to transduce an electrical signal input 51 (encoding or corresponding to an acoustic signal) received by the diver's communication device 100 into an acoustic output signal 52. Input signal 51 can be from one or more of another communication device 100 (either another diver's or a surface ship), a dive computer, a music player (e.g., an MP3 player) or related device. In particular embodiments, input signal 51 can be generated and/or conditioned by a processor 170 (described herein) or other signal conditioning device or circuitry of communication device 100 or a processor 70 resident within mouthpiece 10. Processor 70 or 170 may correspond to a microprocessor and can be configured to generate, and/or condition signal 51, as well as condition signal 41 from microphone 40. Such signal conditioning in either case can include one or more of amplification, filtering, conversion, matching and isolation.

Transducer 50 is also configured to acoustically couple to the diver's upper teeth UT to in turn conduct the acoustic output 52 from the diver's upper teeth through the skull S to the cochlea to generate audible sound in at least one of the diver's ears E when the diver is wearing mouthpiece 10. In many embodiments, the transducer 50 comprises an acoustical plate 53 (also described as a vibrating plate 53) coupled to a driver 54. The plate 53 is configured to engage and acoustically couple to the surface of the diver's teeth and be vibrated by the driver 54 responsive to electrical signal 51. Vibration of the plate 53 produces acoustical signal output 52 which is acoustically conducted to the diver's teeth and then through the bones in his or her skull to the inner ear IE including cochlea C where they are perceived as sound. Plate 53 can be fabricated from ceramic, metal, polymeric material such as a resilient polymer and can have a size and shape to acoustically couple to one or more of the diver's teeth T. In particular embodiments, plate 53 may have a curved horizontal shape 53c corresponding in part to the curvature DC of the diver's dental arches DA to facilitate the plate contacting multiple teeth. Plate 53 may also have one or more ridges or other raised feature 53r configured to enhance acoustical coupling and conduction to the diver's teeth. In particular embodiments, ridges 53r can be positioned to contact the center depressions in the diver's teeth.

In particular embodiments, plate 53 can be configured to have an acoustical impedance approximating or otherwise matched in some fashion (e.g., proportional, inversely proportional, etc.) to that of the diver's teeth (e.g., one or more of the upper teeth). Such embodiments can be achieved by fabricating plate 53 from one or more dental ceramics or other material having similar mechanical properties as the diver's teeth. Other acoustic properties can also be so matched such as the resonant frequency of the plate and the teeth including the upper teeth. Such matching of acoustic properties can be configured to minimize acoustic losses from plate 53 to the teeth or otherwise enhance conduction of acoustic signal 52 through the diver's skull to the inner ear including the cochlea.

In various embodiments, driver 54 comprises an electromagnetic driver 55, which can be directly or indirectly coupled to plate 53. In the latter embodiments, driver 54 comprises electromagnetic driver 55, a movable diaphragm 56 sitting atop or otherwise coupled to the driver 55 and a lever or other connecting means 57 coupling diaphragm 56 to plate 53. Electromagnetic driver 55 can comprise various electromagnetic drivers known in the speaker or earphone arts and can comprise a miniature magnetic 58 which may correspond to a core or coil. One or more of driver 55, movable diaphragm 56, lever 57 and magnet 58 can be fabricated from mems based components either separately or as a single structure. In alternative embodiments, driver 55 may be configured to be directly coupled to plate 53 without diaphragm 56 and/or lever 57.

Typically, acoustic transducer 50 including plate 53 is positioned to engage the upper (e.g., maxillary) back teeth of the diver's mouth M, but may be positioned to engage any tooth or group of teeth in the diver's mouth such as in the front either upper or lower teeth. As an addition or alternative embodiment, transducer 50 including plate 53 may also be configured to engage and be acoustically coupled to the diver's upper palate (the hard palate). In such embodiments, the plate 53 can have a curved shape matched to at least a portion shape of the upper palate (also known as the roof of the mouth). Such embodiments allow for larger surface area of acoustical conduction to the diver's skull and do not require the diver to bite down on the mouthpiece when speaking.

In various embodiments, mouth piece 10 can include a sensor 60 which is configured to detect the diver's breath and generate an output signal 61 which is used to switch off microphone 40 and/or attenuate or gate the output signal 42 coming from the microphone to communication device 100 during a time period of the diver's respiration. In the first configuration (where the microphone is switched off), the output signal 61 can be fed into microphone switching device 43*s*, and in the second signal 61 can be sent to communication device 100 including processor 170. In many embodiments, sensor 60 can correspond to a miniature flow/velocity sensor for detecting a flow rate and/or velocity of the diver's breath moving through the mouth. When the velocity or flow exceeds a threshold value, corresponding to flow or velocity of a diver's breath, the microphone 40 can be configured to shut off, and or output signal 42 can be attenuated or gated by processor 170. The threshold value for flow and/or velocity can be selected so as to be able to distinguish between a velocity or flow rate when the diver is speaking versus, breathing, the former being lower than the latter. In various embodiments, processor 170 and/or microphone 40 may include logic for shutting off the microphone 40 and/or attenuating or gating signal 42 or 51. In specific embodiments, such logic for attenuating or gating signal 42 or 51 can be incorporated into one or more modules 190, described herein.

For embodiments where sensor 60 comprises a flow sensor, the sensor can be positioned in a variety of locations on mouthpiece 10 for detecting the diver's breath. In preferred embodiments, flow/velocity sensor 60 is placed toward the front section 14 of the mouthpiece 10 (e.g., near the front teeth), preferably in the center 15 of the front section 14, so as to be in a location in the diver's mouth having the greatest velocity/flow rate, for example, at the peak of a velocity profile such as a velocity profile for poiseuille flow. Such profiles can be determined using standard measurement methods know in the art for a standard mouth shape, size and tidal volume (or other related respiratory measurement), with adjustments made for a particular individual.

Figure 10:
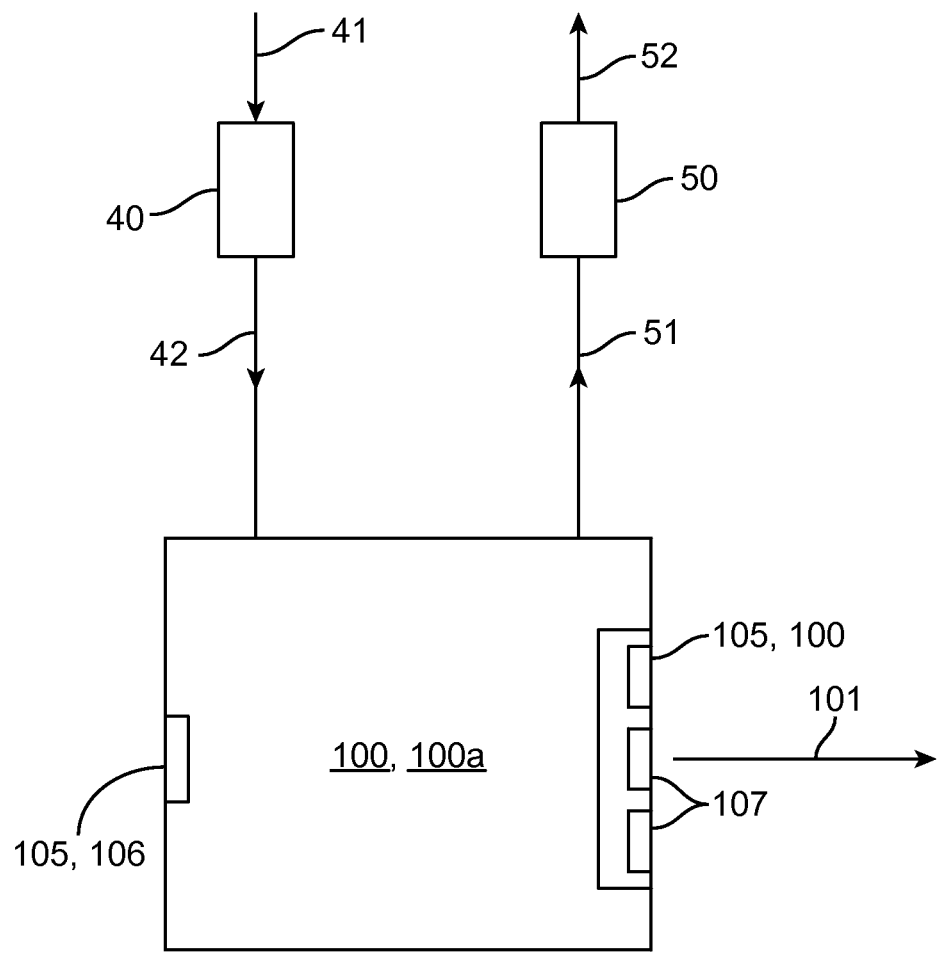
FIG. 10 is a schematic view illustrating the configuration and operation of an embodiment of the communication device for use with embodiments of the voice communication mouthpiece apparatus.

Communication device 100 can employ a variety of communication modalities including, without limitation, electromagnetic, such as RF, magnetic, optical, acoustical and combinations thereof. Referring now to FIG. 10, in preferred embodiments, the communication device 100 can correspond to an ultrasonic or other acoustical transmission device 100*a* which transduces the electrical output signal 41 into an acoustic signal 101 which is transmitted by the acoustical transmission device 100. In such embodiments, communication device 100 can comprise one or more acoustical transducers 105 which transmit and/or receive acoustical energy at a selected frequency or range of frequencies. Selected frequencies can be in the range of 10 to 40 kHz, 30 to 40 kHz, 100 to 200 kHz and 150 to 200 kHz. This frequency can be adjusted for one or more of the depth, salinity and temperature conditions of the water. Acoustical transducers 105 may correspond to one or more ultrasonic transducers 106 which can comprise various piezoelectric materials such as piezoelectric ceramic materials. The particular acoustical transducer 105 and acoustical frequency can be selected based on the desired acoustical transmission range, acoustical sensitivity, bandwidth, maximum diving depth, temperature and salinity conditions and related parameters. Also, acoustical transducers 105 may be configured as both acoustical transmitters and receivers so as to send and receive acoustical signals. In many embodiments, transducers 105 can be arranged as an array 107 of transducers which may include a phased array formation. Array 107 can be configured to optimize one or more of the transmission range, sensitivity and bandwidth of communication device 100. In various embodiments, the frequency, power settings and sensitivities of transducers 106 and/or array 107 can be selected to enable underwater transmission ranges for communication device 100 up to 1500 feet and more preferably up to 2500 feet (30.48 to 457.2 meters) and more preferably up to 2500 feet (762 meters) with even greater transmission ranges contemplated. Also, communication device 100 can include signal generation and selection circuitry to allow for communication over multiple selectable acoustic frequency ranges, also referred to herein as channels. Communication device 100 may also include a multiplexing device (not shown) coupled to at least one of the transceiver or signal processing circuitry so as to allow for the transmission of multiple signals. The multiplexing device may be configured for one or more of time division, frequency division, or code division multiplexing. In alternative embodiments communication device 100 can comprise an RF based device and can even include RF communication chip 95 described above. In these and related embodiments, RF communication chip 95 is configured to have a selected power and frequency to enable underwater communication with other divers 210 and ship 220.

Figure 11:
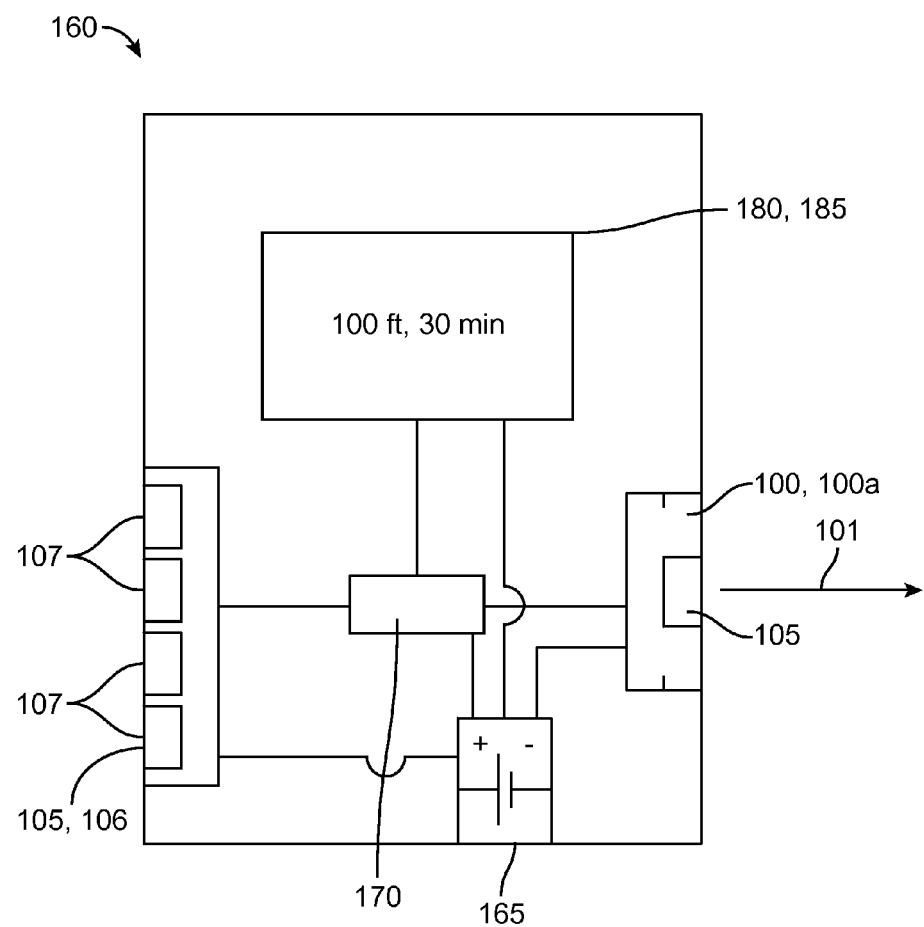
FIG. 11 is a schematic view illustrating the configuration and operation of an embodiment of a PWE device (such as a dive computer) including a communication device for use with embodiments of the voice communication mouthpiece apparatus.

Referring now to FIG. 11, in many embodiments communication device 100 can be incorporated into a portable watertight electronic (PWE) device 160. PWE device 160 will typically comprise a PDA (Personal Digital Assistant) like device 160 that is worn or carried by diver 200. PWE device 160 may also comprise or be integrated into a dive watch, dive computer or other device or equipment carried by the diver, e.g., a flash light, depth gauge, regulator etc. For ease of discussion, PWE device 160 will now be referred to as a dive computer 160; however, other embodiments are equally applicable. Dive computer 160 includes a processor 170, display 180, user input means 185 and an electrical power source 165. Power source 165 may correspond to a portable battery such as a lithium or lithium ion battery or other battery chemistry known in the art. User input means 185 may correspond to a touch screen which may be separate or integral with display 180. Processor 170 includes one or more modules 190 including software programs or other logic for controlling various operations of device 160 including those of communication device 100. For example, in one embodiment, module 190 can comprise a program for discriminating between when the diver is speaking versus breathing using an output 61 from sensor 60 and then gate or attenuate microphone output 42 and/or transducer output 51 accordingly.

The processor 170 will typically correspond to one or more microprocessors known in the art and can be selected for increased durability, fault tolerance and pressure resistance for underwater operation, using various MIL-SPEC criteria known in the military/naval equipment arts. Processor 170 will typically include one or more modules or algorithms 190 for generating, conditioning and controlling signals sent to and from the mouthpiece 10 as well as controlling other operations to allow two way voice communications by diver 200. Modules 190 may also be configured for computing, monitoring and communicating various physiological data of the diver including for example, heart rate, respiration rate, blood pressure, blood oxygen saturation and other blood gas measurements (e.g., blood nitrogen). Processor 170 may also include other modules 190 which use such data to determine if the diver is in a state of physiologic stress (e.g. such as that caused by low blood oxygen levels, e.g., "hypoxia" or out gassing of nitrogen, causing the "bends") or a precursor state which precedes or is otherwise predictive of a state of physiological stress. When such a stress state or precursor state of stress is detected, it may be communicated by the first communication device 100 to a second communicative device 110 to allow other individuals (such as those on the dive boat or even those onshore) to monitor the diver(s) and alert them when it is time to ascend and/or if diver requires assistance.

While in many embodiments, mouthpiece 10 is configured for use with a SCUBA 80, in other embodiments, the mouthpiece can also be configured for use with a snorkel or like apparatus, allowing a snorkeler to have two way voice communication with another snorkeler, diver 210, or ship 220. In such embodiments, the entire system 5, including communication device 100 can be contained in the mouthpiece 10. Further, in such embodiments, the connecting portion 11 can be sized and shaped to detachably connect to a standard sized snorkel, allowing the diver to attach the mouthpiece 10 to an off the shelf commercial snorkel and have a skin diving version of underwater communication system 5. In still other embodiments, mouthpiece 10 and system 5 can be adapted for use with virtually any breathing apparatus such as that used by fire and mine rescue personal, so as to allow two way voice communications with such apparatus.

CONCLUSION

The foregoing description of various embodiments of the invention has been presented for purposes of illustration and description. It is not intended to limit the invention to the precise forms disclosed. Many modifications, variations and refinements will be apparent to practitioners skilled in the art. For example, various embodiments of the communication system 5 including the mouthpiece 10 can be adapted for one or both of salt and fresh water environments, as well as deep dives (e.g., 60 to 200 meters) and cold water environments. They may also be adapted for use in closed circuit re-breathers in addition to standard SCUBA equipment. In some embodiments, the mouthpiece can receive inputs of one or more of the depth, temperature and salinity of the surrounding water so as to adjust for changes (e.g., by diver computer 160) in the conduction of sound caused by one or more of these parameters.

Elements, characteristics, or acts from one embodiment can be readily recombined or substituted with one or more elements, characteristics or acts from other embodiments to form numerous additional embodiments within the scope of the invention. Moreover, elements that are shown or described as being combined with other elements, can, in various embodiments, exist as standalone elements. Hence, the scope of the present invention is not limited to the specifics of the described embodiments, but is instead limited solely by the appended claims.

What is claimed is:

1. A mouthpiece apparatus for underwater voice communication by a diver, the apparatus comprising:
   a mouthpiece having an exterior coupling element for coupling to an air conduit, and an interior portion coupled to the exterior coupling element and worn in the diver's mouth, the coupling element and interior portion including a lumen for the passage of respired air there through, the interior portion having a curved shape which conforms to a curvature of the diver's mouth; and right and left bite structure attached to the interior portion, the left and right bite structures including upper and lower bite surfaces for engaging a bite surface of the diver's upper and lower teeth;
   an acoustic transducer positioned on the top surface of at least one of the left or right bite structures, the acoustic transducer positioned to make contact with the diver's teeth, the acoustic transducer configured to transduce an electrical signal input into an acoustic output and acoustically couple to the diver's upper teeth to conduct the acoustic output from the diver's upper teeth through the skull to generate audible sound in at least one of the diver's ears when the diver is wearing the mouthpiece; and
   a microphone positioned in or on the mouthpiece for receiving the diver's voice and generating an electrical signal output when the diver is wearing the mouthpiece.

2. The mouthpiece apparatus of claim 1, wherein the mouthpiece is adapted for connection and use with a self-contained underwater breathing apparatus (SCUBA), the air conduit comprising an air hose for connection to a SCUBA tank.

3. The mouthpiece apparatus of claim 1, wherein the mouthpiece is adapted for connection and use with a snorkel, the air conduit comprising a snorkel.

4. The mouthpiece apparatus of claim 1, wherein the mouthpiece is adapted to be coupled to a fitting on the air conduit.

5. The mouthpiece apparatus of claim 1, wherein the bite structures are positioned on the mouthpiece to contact the diver's back teeth.

6. The mouthpiece apparatus of claim 1, wherein at least one of the right or left bite structures includes a retaining flange oriented substantially perpendicular to the upper and lower bite surfaces and which engages an inside surface of the divers teeth.

7. The mouthpiece apparatus of claim 1, wherein at least one of the left or right bite structures is configured to be acoustically isolated from the mouthpiece.

8. The mouthpiece apparatus of claim 1, wherein the mouthpiece has a unitary construction.

9. The mouthpiece apparatus of claim 1, wherein at least a portion of the mouthpiece comprises an elastomer, silicone or polyurethane.

10. The mouthpiece apparatus of claim 1, wherein the microphone is positioned in or on the left or right bite structure.

11. The mouthpiece apparatus of claim 10, wherein the microphone is positioned in or on a bite structure opposite from where the acoustic transducer is positioned.

12. The mouthpiece apparatus of claim 10, wherein the bite structure where the microphone is positioned is configured to attenuate vibrations from the acoustic transducer.

13. The mouthpiece apparatus of claim 1, wherein the microphone is positioned in the mouthpiece.

14. The mouthpiece apparatus of claim 13, wherein the microphone is positioned in the mouthpiece to attenuate breath sounds.

15. The mouthpiece apparatus of claim 13, wherein the microphone is positioned in the mouthpiece to attenuate feedback from the acoustic transducer.

16. The mouthpiece apparatus of claim 13, wherein the microphone is potted in an acoustically dampening material or acoustically dampening silicone to attenuate feedback from the acoustic transducer.

17. The mouthpiece apparatus of claim 13, wherein the mouthpiece includes an aperture for conduction of sound to the microphone.

18. The mouthpiece apparatus of claim 17, wherein the aperture is configured to transmit sound, but impede passage of water.

19. The mouthpiece apparatus of claim 18, wherein the aperture includes a covering which transmits sound, but impedes passage of water.

20. The mouthpiece apparatus of claim 18, wherein the aperture has diameter which transmits sound, but impedes passage of water.

21. The mouthpiece apparatus of claim 1, wherein the microphone includes a filter for filtering out breath sounds made by the diver.

22. The mouthpiece apparatus of claim 1, wherein the acoustic transducer comprises a left and right acoustical transducer positioned in the left and right bite structure respectively.

23. The mouthpiece apparatus of claim 1, wherein the acoustic transducer comprises a piezo-electric material.

24. The mouthpiece apparatus of claim 1, wherein the acoustic transducer comprises an acoustical plate coupled to a driver, the acoustical plate configured to be vibrated by the driver responsive to the electrical signal input and acoustically coupled to the upper teeth.

25. The mouthpiece apparatus of claim 24, wherein the acoustical plate is configured to vibrate at about at least one predetermined resonant frequency of the diver's upper teeth.

26. The mouthpiece apparatus of claim 24, wherein the acoustical plate has an acoustical property matched to that of the diver's upper teeth.

27. The mouthpiece apparatus of claim 26, wherein the acoustical property is at least one predetermined resonant frequency of the diver's upper teeth.

28. The mouthpiece apparatus of claim 26, wherein the acoustical property is an acoustical impedance of the diver's upper teeth.

29. The mouthpiece apparatus of claim 24, wherein the driver comprises an electromagnetic driver and a movable diaphragm.

30. The mouthpiece apparatus of claim 24, wherein the acoustical plate is coupled to the driver by a lever.

31. The mouthpiece apparatus of claim 24, wherein the acoustical plate has a horizontal curvature corresponding to a horizontal curvature of a dental arch.

32. The mouthpiece apparatus of claim 24, wherein the acoustical plate is conformable to the bite surface of the diver's teeth.

33. The mouthpiece apparatus of claim 24, wherein a tooth engaging surface of the acoustical plate includes at least one ridge for enhancing acoustical coupling of the acoustical plate to the teeth.

34. The mouthpiece apparatus of claim 24, wherein the acoustical plate comprises a resilient material, a polymer, a ceramic or a ceramic having mechanical properties of human teeth.

35. The mouthpiece apparatus of claim 1, further comprising a conductive wire coupled to least one of the microphone or the acoustic transducer.

36. The mouthpiece apparatus of claim 35, wherein the conductive wire includes a first wire coupled to the microphone and a second wire coupled to the acoustic transducer.

37. The mouthpiece apparatus of claim 35, wherein a distal end of the conductive wire includes an electrical coupling for coupling at least one of the microphone or the acoustic transducer to an external electrical device or circuit.

38. The mouthpiece apparatus of claim 35, wherein at least a portion of the conductive wire is embedded in the mouthpiece.

39. The mouthpiece apparatus of claim 35, wherein a distal portion of the conductive wire extends out of a distal end of the lumen.

40. The mouthpiece apparatus of claim 1, further comprising a communication device coupled to at least one of the microphone or the acoustic transducer.

41. The mouthpiece apparatus of claim 40, wherein the communication device comprises a receiver configured to receive a signal used to generate the electrical signal input.

42. The mouthpiece apparatus of claim 40, wherein the communication device comprises a transmitter configured to transmit the electrical signal output from the microphone.

43. The mouthpiece apparatus of claim 40, wherein the communication device comprises an RF communication device, an RF chip, or an RF transceiver chip.

44. The mouthpiece apparatus of claim 40, wherein the communication device is configured to send and receive signals between a second communication device worn or in proximity to the diver.

45. The mouthpiece apparatus of claim 44, wherein the second communication device comprises an RF communication device, a communication device incorporated into a dive computer or a communication device incorporated into a second mouthpiece apparatus coupled to a SCUBA worn by the diver.

46. The mouthpiece apparatus of claim 40, wherein the communication device is embedded in the mouthpiece.

47. The mouthpiece apparatus of claim 1, further comprising a portable battery coupled to at least one of the microphone or the acoustic transducer.

48. The mouthpiece apparatus of claim 47, wherein the battery is embedded in the mouthpiece.

49. A system for under water communication between divers, the system comprising:
a first mouthpiece apparatus comprising the components of claim 1,
a second mouthpiece apparatus comprising the components of claim 1, wherein the first and the second mouthpiece apparatuses are coupled to a self-contained underwater breathing apparatus (SCUBA) and wherein the first mouthpiece apparatus is configured for direct communication with the second mouthpiece apparatus so as to allow a first diver to speak and hear audible messages from a second diver using the same SCUBA.

50. The system of claim 49, wherein the second mouthpiece apparatus is coupled to a hose configured for buddy breathing.

51. The system of claim 49, further comprising a connection device for operatively connecting the first and second mouthpiece apparatus.

52. A system for under water voice communication, the system comprising:
the apparatus of claim 1; and
an underwater acoustic communications device comprising:
an acoustic transceiver for sending and receiving acoustic signals conducted through water; and
processing circuitry for processing acoustic signals received from the acoustic transceiver into the electrical signal input for the acoustic transducer and for processing the electrical signal output from the microphone into an input used by the acoustic transceiver to generate acoustic signals sent by the acoustic transceiver.

53. The system of claim 52, wherein the acoustic transceiver comprises at least one piezo-electric crystal.

54. The system of claim 52, wherein the acoustic signals sent by the communication device can be received by another underwater communication device up to about 1500 feet away.

55. The system of claim 52, wherein the acoustic signals sent by the communication device can be received by an underwater communication device positioned near the surface of the water.

56. The system of claim 52, wherein the acoustic signals sent and received by the acoustic transceiver are in the range of about 30 to 40 kHz.

57. The system of claim 52, wherein the acoustic signals sent and received by the acoustic transceiver are in the range of about 100 to 200 kHz.

58. The system of claim 52, wherein the acoustic signals sent and received by the acoustic transceiver comprise at least a first channel having a first frequency range and at least a second channel having a second frequency range.

59. The system of claim 52, further comprising a multiplexing device coupled to at least one of the acoustic transceiver or processing circuitry.

60. The system of claim 59, wherein the multiplexing device is configured for time division, frequency division or code division multiplexing.

* * * * *